July 26, 1932. W. HUNT 1,868,708
AUTOMATIC FIRE SAFETY DEVICE
Filed March 27, 1930
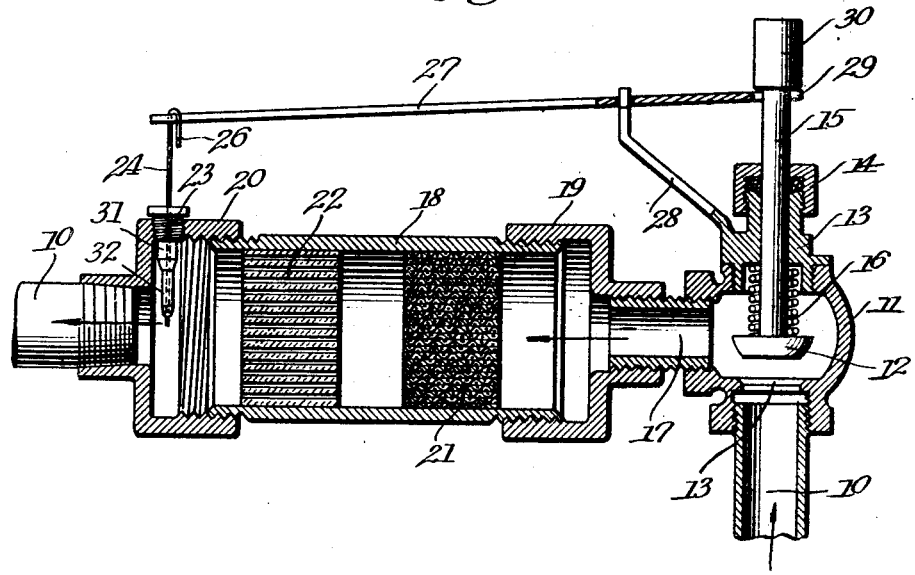
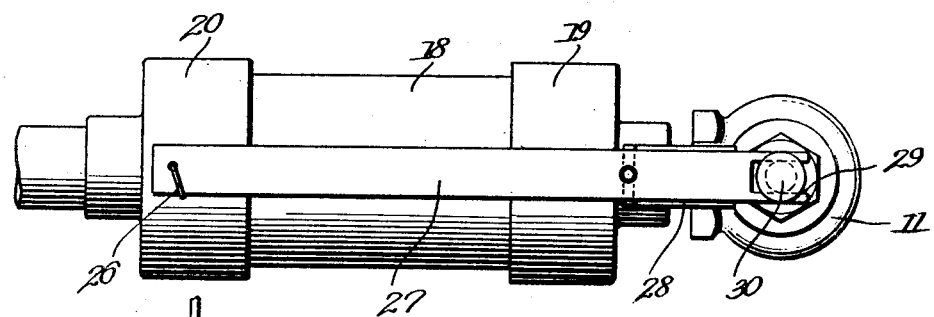
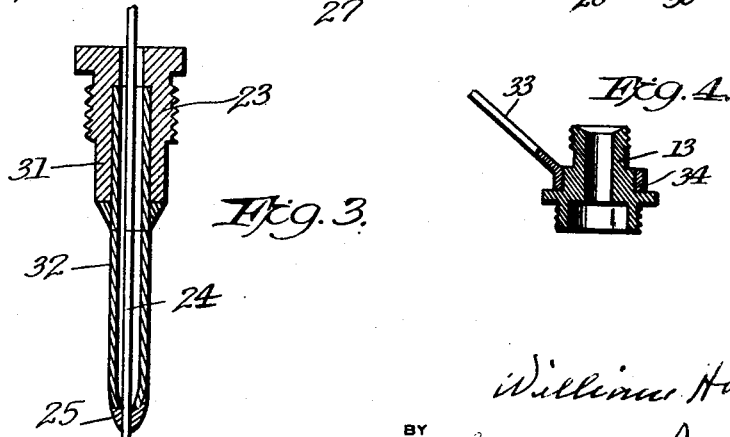
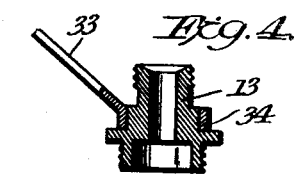
INVENTOR
William Hunt
BY
Cushman, Bryant Darby
ATTORNEYS Patented July 26, 1932

1,868,708

UNITED STATES PATENT OFFICE

WILLIAM HUNT, OF BALTIMORE, MARYLAND, ASSIGNOR TO THE C. M. KEMP MANUFACTURING COMPANY, OF BALTIMORE, MARYLAND, A CORPORATION OF MARYLAND

AUTOMATIC FIRE SAFETY DEVICE

Application filed March 27, 1930. Serial No. 439,453.

This invention relates to what are known as "flash back" preventers designed to guard against flame or igniting temperatures from burners or other equipment using gas or other combustible fuel returning through the line to the source of supply. Specifically it has to do with the fusible release or anchoring device described and shown hereinafter, and I make no claim to the other features shown, which are not of my invention.

Broadly, such "flash back" devices are old and have been developed along many different lines. One example of such devices is found in Patent No. 688,863, C. M. Kemp, December 17, 1901, and it is upon this general type of device as shown in the Kemp patent, that the present development is an improvement.

It has for its object to provide a construction in which, upon persistence of flame or dangerous temperature in the line of any appreciable extent, the flow of gas will be automatically cut off and such cut-off condition of the gas maintained until the apparatus is reset for normal operation. Furthermore, simplicity of construction and operation is aimed at, and readiness of renewal of parts destroyed or deranged by any "flash back" is observed in working out the invention; and, what is of highest importance, the disposition of the parts is such that there is no likelihood of gas leakage from the line in which the safety device is installed.

These objects are accomplished by providing a valve casing, to be inserted in the pipe line, having a normally open, self-closing inlet valve, which, so long as the apparatus is functioning satisfactorily, will permit gas flow. This valve is controlled with respect to its cut-off movements by a heat responsive device placed in the line at a remote point on the outlet side of the valve casing, and which, upon any persistence of flame or high temperature in the line, will be released, permitting the inlet valve automatically to close and cut off the gas flow. The parts making up the valve mechanism and release are simple, and the heat responsive means is of such construction that it may be readily inserted in the line and protruded into the area which may be reached by flame or high temperatures. Its construction is extremely simple so that it does not interfere with flow through the line; it can be readily inserted and renewed; and danger of leakage of gas from the line is minimized. The flame or temperature responsive device is of such character and low cost that spares may be kept on hand and new release devices substituted without the necessity of repairing the old devices. Such old devices, however, since they are simply released and rarely destroyed, may be repaired at small expense and again utilized.

In order that the invention may be clear to those skilled in the art, I have illustrated one form of carrying out the invention in the drawing herewith, and in said drawing:

Figure 1 is a longitudinal sectional view through the fire check and release.

Figure 2 is a view in plan of the check and release shown in Figure 1.

Figure 3 is a detail in vertical section of the flame responsive device, and

Figure 4 is a sectional view of a slightly modified construction.

Referring to the drawing by numerals, 10 indicates the gas line with the gas flowing in the direction of the arrows:—

Inserted in the line is a valve casing 11 of any suitable type having the valve 12, of any usual construction, to engage the seat 13 and close the port to the gas line. The valve casing has the bonnet 13 with gland and gland nut 14 through which the stem 15 of the valve 12 passes. A spring 16 between the valve head 12 and the bonnet 13 tends normally to urge the valve to its seat.

Broadly considered, therefore, the invention involves a casing having an inlet cut-off which automatically closes on release to cut off the flow of gas from the inlet, and a remotely placed heat responsive device located in the line on the outlet side of the cut-off, said heat responsive device being of such character that in the presence of flame or high temperature it will act, suitable connections being provided between the cut-off device and the heat responsive device, so that the cut-off is held in normally open position and released for closure upon action of the heat responsive device under predetermined temperatures. In the illustration here shown, there is embodied furthermore the element of a fire check interposed between the casing and the heat responsive device, which element further adds to the efficiency of the construction. From the valve casing the gas line, in the construction here shown, passes by pipe 17 to any suitable check, made up, as here shown, of the cylindrical casing 18, having the cap 19 at one end coupled to the pipe 17, and the cap 20 at the other end coupled to the line 10, as shown in Figure 1.

The check 18 may be provided interiorly with any suitable flame check elements and gas stream interrupters, the present device being shown as having a reticulated mass 21, preferably formed by winding a foraminous screen upon itself to form a series of closely adjacent convolutions through which the gas coming from the inlet passes, and which serves to break up and deliver, in a thoroughly commingled condition, the combustible material, which may be of any suitable gaseous or liquid type, as, for example, city gas, fuel gas, acetylene gas, etc., dependent on the particular needs of the user.

Spaced a substantial distance from the interrupter 21 on the outlet side of the check 18, is a mass of refractory material 22 having passages therethrough. It is here shown as a molded mass having longitudinal perforations so as to permit the combustible material to pass freely therethrough and be delivered in a series of fine streams which pass from the check to the outlet side of the gas line 10.

With this arrangement the combustible fluid, broken up and commingled by the interrupter 21 and the jet forming refractory element 22, is delivered to the gas line 10, through which it passes to the point of consumption in perfectly combustible condition. Where the check is used the two elements 21 and 22 will effectively check any "flash back" if flame returns through the gas line 10 to the check 18. The refractory material 22 interrupts the flame and prevents its reaching in any damaging degree the screen interrupter 21 so that injury or destruction of the check or its associated parts is prevented, while the gauge filler block 21 serves to back up the refractory section 22 and absorbs any explosion shock if the fuel be ignited on the outlet side of the check.

In order that the fuel supply may be quickly cut off under abnormal conditions of flame or high temperatures in the outlet side of the line by bringing about an automatic closing of the valve 12, there is provided a valve release made up of a heat responsive device at a point remote from the valve casing. In this embodiment it is shown on the side of the check 18 farthest from the valve 12, which, upon any persistence of flame on the delivery side of the check, will promptly release the valve 12 and permit it to close under the action of the spring 16.

This heat responsive device, as here shown, is made up of the member 23 having a threaded head portion provided with tool engageable means adapted to be screwed into a wall at any appropriate point in the outlet side of the line. It is here shown fixed in an orifice in the wall of the head 20 of the check 18, so that it is removable with said head. The device 23 and its associated parts make an absolutely tight joint when fitted in the orifice of a wall, so that no leakage of fuel can occur. Furthermore, that is accomplished in a simple manner, and the use of stuffing boxes or accurately fitted sliding parts is unnecessary. The member 23 extends inwardly to a point substantially centrally of the gas line 10, as shown in Figure 1, and is provided with a passage traversed by a release wire 24, the lower end of which is anchored at the tip of the member 23 by fusible means 25, preferably a solder quickly responsive to high temperature. As here shown, the release wire 24 extends through the tip of the member 32 and is there anchored by the fusible material 25, but it will be understood that this is merely illustrative, and that the wire 24 may be anchored in the tube 32 in other ways, the only thing necessary being to so anchor the lower end of the wire to the tube by fusible material that it will, under high temperature, be released and allow the functioning of the device with which it is associated. The release wire 24 will be made of material highly resistant to temperature, as, for example, silicon wire, so that there will be no danger of fusing it, and particularly its lower exposed end, which might result in clogging of its action and failure of release. This is important for the reason that, as shown in Figure 3, the release wire 24 has a reasonably close sliding fit with the aperture in the coned end of the member 23, but with sufficient clearance laterally so that any distortion or fusing of the wire will not cause jamming at the lower end. By contracting or coning the end of this tubular portion of the member 23, the wire 24 will be centered, and the soldering operation rendered simple and easy. Furthermore, and what is of prime importance, is, that by reason of the coned end of the member 23 with the anchoring wire 24 entering the aperture in such coned end, the fusible material 25 will, upon melting, be quickly and cleanly scraped from the end of the wire 24 as that is pulled out under the action of the valve closing spring. It will be observed from the disclosure in Figure 3 that the solder or other fusible securing means is mainly disposed exteriorly of the device, so that it is directly exposed to flame or high temperature, and because of the coned or contracted lower end of the member 23, above referred to, the orifice of which member 23 is entered by the wire 24, the fusible material 25 does not clog to any extent the hollow member 23, nor can it be drawn in upon movement of the wire 24, to clog or interfere with the action of the parts.

At its upper end release wire 24 engages, by means of any suitable device, as by hook portion 26, passing through a suitable aperture therein, with a lever 27 loosely fulcrumed upon an arm 28, by means of perforation and pin, which extends from the bonnet 13 of the valve and shown in Figure 1 as formed integrally therewith. On the other side of the fulcrum 28 the lever 27 is engaged with the upper end of the valve stem 15, that engaging means being here shown as a notch 29, the end of the lever engaging below a head 30 at the upper end of the valve stem.

In the construction shown in Figure 3, member 23 is shown as made up of two parts, namely, the portion 31 designed to be screw threaded into the head 20 and the portion 32 in the form of a thin tubular section to provide the extension to project into the chamber, these parts being suitably secured together. The member 23 and its extension may, however, be formed in other ways, and might preferably be made integral. It will be observed that the hollow member 23, fitted with a gas tight joint in an orifice in the wall, and with its thin walled tubular portion extending into the chamber and its releasing wire fusibly connected or soldered at one end to the contracted or coned tip of the tubular portion, gives a construction which will respond very quickly to rise in temperature in the chamber, and thus provide a quick acting release. Immediately the valve is released and closes, all danger of flame or high temperature passing to the hollow member on the outside of the apparatus is eliminated, for pressure on the outlet side of the valve ceases instantly upon closing of the valve. In the form of valve shown in Figure 1, the fulcrum for the release lever is shown as integral with the bonnet of the valve. In Figure 4 the fulcrum 33 is formed separately from the bonnet, and, in the particular adaptation here shown, discloses a ring 34 at its lower end adapted to be fitted to the bonnet and secured in any suitable manner, as by a driving fit or any other suitable securing means.

The operation of the device will be clear from the foregoing description. It is briefly this. The combustible fluid passing through the gas line 10, will, with the valve 12 in normal condition, go to the outlet side and past the inwardly projecting heat responsive device, remotely placed relative to the valve. Where the check 18 is used it passes by way of pipe 17 to the outlet side of the line. When the check 18 is used the fuel is there broken up and delivered to the gas line 10 on the other side of the check in highly combustible condition. Any return of flame or high temperature will at once release the lever holding wire 24 and valve 12 will close. Where the check 18 is inserted in the line, return from the outlet side to the valve will be interrupted by the members 22 and 21, and furthermore, as pointed out, flow of the combustible fluid, upon any persistence of flame or high temperature, will be interrupted by the closing of the valve 12, which will be released and closed by its spring immediately the anchor 25 of the flame responsive device is fused, releasing the wire 24 and allowing the valve lever 27 to tilt under the pull of the spring 12, and release the valve.

Such changes in the mechanical make-up and construction from the form of the invention here shown as are within the skill of the mechanic may, of course, be made, and still be within the range of my invention.

I claim:—

1. An anchoring device of the class described, comprising a hollow member adapted to be engaged with and project inwardly from a chamber wall, and a releasable wire traversing said member and secured thereto at one end with its other end projecting outwardly from said member.

2. An anchoring device of the class described, comprising a hollow member adapted to be engaged with and project inwardly from a chamber wall, and a heat released anchoring wire traversing said member and secured thereto at one end with its other end projecting outwardly from said member.

3. An anchoring device of the class described, comprising a hollow member having a head portion adapted to be engaged with the wall of a chamber, and a relatively thin tubular section extending therefrom, a heat released anchoring wire traversing said member and releasably secured thereto at one end, with the other end of said anchoring wire projecting outwardly beyond the head portion of said plug member.

4. An anchoring device of the class described, comprising a hollow member having a threaded head portion, a relatively thin tubular section extending therefrom and having a contracted lower end, and an anchoring wire traversing said hollow member and connected by heat responsive means at one end to the contracted end of said plug, the other end of said wire projecting outwardly beyond the threaded head of said plug.

5. A fusible release device of the class described, comprising a hollow member, an anchoring wire traversing said hollow member and projecting beyond an end thereof, and fusible means to secure the projecting end of the wire to the end of the said hollow member.

6. A fusible release device of the class described, comprising a hollow member, an anchoring wire traversing said hollow member and projecting beyond an end thereof, and fusible means to secure the projecting end of the wire to the end of said hollow member, said fusible means being disposed substantially exteriorly of said hollow member.

7. A fusible release device of the class described, comprising a hollow member having a reduced orifice at one end, an anchoring wire traversing said hollow member and protruding through said reduced orifice, and fusible means disposed exteriorly of the orifice and about the protruding end of said wire.

8. A fusible release device of the class described, comprising a hollow body portion, one end of which is contracted to form a reduced orifice, an anchoring wire traversing said hollow member and protruding through said reduced orifice, and fusible means disposed exteriorly of the orifice and about the protruding end of said wire.

9. A fusible release device of the class described, comprising a hollow body portion having a thin walled section provided with a contracted end to give a reduced orifice, an anchoring wire traversing said hollow body portion and protruding through said reduced orifice, and fusible means disposed exteriorly of the orifice and about the protruding end of said wire.

10. A fusible release device of the class described, comprising a hollow body portion having a thin walled section having its end coned to provide a reduced orifice, an anchoring wire traversing said hollow body portion and protruding through said reduced orifice, and fusible means disposed exteriorly of the orifice and about the protruding end of said wire.

11. An anchoring device of the class described, comprising a hollow member adapted to be engaged with and project inwardly from a chamber wall, and a releasable wire, one end of which is secured to said hollow member and the other end of which projects outwardly from said member.

12. An anchoring device of the class described, comprising a hollow member adapted to be engaged with and project inwardly from a chamber wall, and a heat released anchoring wire, one end of which is secured to said hollow member and the other end of which projects outwardly from said member.

13. An anchoring device of the class described, comprising a hollow member adapted to be engaged with and project inwardly from a chamber wall, and an anchoring wire connected by heat responsive means at one end to said hollow member with the other end of said wire projecting outwardly from said member.

In testimony whereof I have hereunto set my hand.

WILLIAM HUNT.